UNITED STATES PATENT OFFICE.

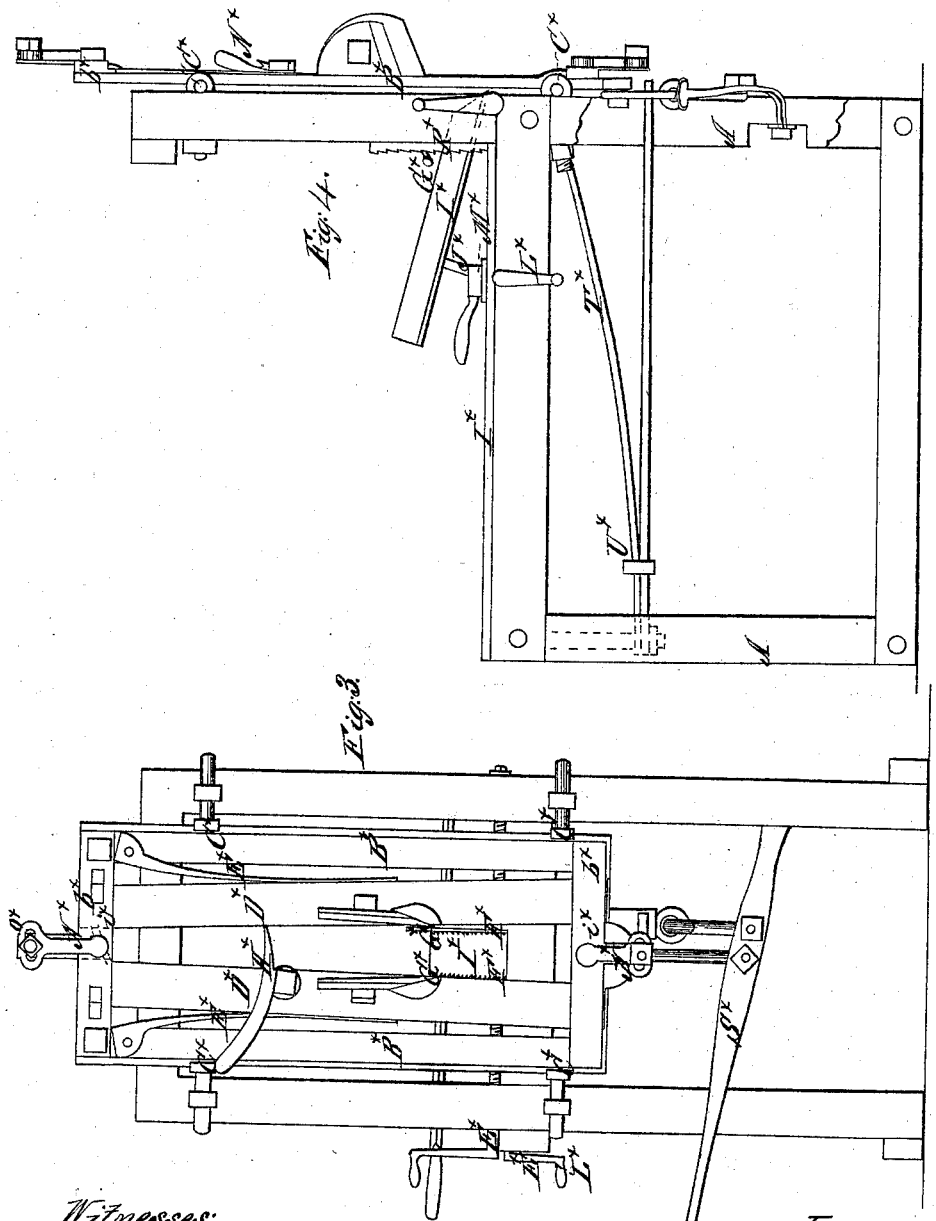

LAWRENCE MASON, OF TURIN, NEW YORK.

IMPROVEMENT IN TENONING-MACHINES.

Specification forming part of Letters Patent No. 54,749, dated May 15, 1866.

*To all whom it may concern:*

Be it known that I, LAWRENCE MASON, of Turin, in the county of Lewis and State of New York, have invented certain new and useful Improvements in Tenoning-Machines; and I do hereby declare the following to be a full, clear, and exact description of the nature, construction, and operation of the same, reference being had to the accompanying drawings, which are made part of this specification, and in which—

Figure 3 is a front elevation illustrating the tenoning devices, and Fig. 4 is a side elevation of the devices shown in Fig. 3.

Similar letters of reference illustrate corresponding parts in the different figures.

The subject of this invention is a tenoning-machine with a novel arrangement of devices for actuating and gaging the tenoning saws and chisels.

In order that others skilled in the art to which said invention appertains may be enabled to fully understand and use the same, I will proceed to describe it in detail in connection with the accompanying drawings.

Tenoning apparatus is shown in Figs. 3 and 4. B* represents a vertically-reciprocating frame or gate, which moves within the guides C* C*, attached to the main frame. In this frame B* are mounted the parallel bars D* D*, the ends of which fit within suitable guideways b* b* at the top and bottom of the frame B*.

E* E* represent springs which are fixed to the frame B*, so as to bear against the bars D* D*, for the purpose of exerting a constant pressure upon said bars, and thus keep the saws F* F* and cutters G* G* properly up to their work.

The saws and cutters are attached to and move with the bars D* D*, which rise and fall with the frame B*. The saws cut against the grain of the wood and form the shoulders of the tenon, while the cutters, whose action is subsequent to that of the saws, cut with the grain of the wood and form the sides of the tenon.

The stuff is fed to the action of the saws and cutters upon the adjustable guide I*, which can be raised up into the inclined position represented, so as to cause the stuff to be fed to the saws in such a way that they shall bevel the shoulders of the tenon when desired. For this purpose any degree of inclination may be given to the guide I* by the arm J* on the shaft K*, which is turned by the crank-handle L* and held in any position to which it may be turned by means of an eyebolt and nut, M*.

H* is a lever which may be brought to bear against the contiguous edges of the bars D* D*, so as to force said bars, with the saws and cutters, a sufficient distance asunder to permit the stuff to be introduced between them preparatory to the depressing of the frame to form the tenon. When released by the lever H* the bars, saws, and cutters are brought together by the springs E* E*.

The space between the bars D* D*, when under the action of the springs E* and released by the lever H*, is gaged by means of small levers or tappets i* i*, (seen in dotted lines in Fig. 3,) which are each turned upon a fulcrum between the adjacent ends of the bars D* D* by a slotted arm, N*, which has a nut, O*, whereby it is retained in any position to suit the adjustment of i*. Hence it will be seen that the adjustment of the tappets i* gages the saws and cutters, and thus determines the size of the tenon.

I propose to substitute wedges or keys for the tappets i*.

The guide I* may be moved laterally upon the table I'* by the screw-shaft P*, which works through the socketed end of the guide I*. This lateral adjustment of the guide is made when it is desired to change the position of the tenon or submit the work to the action of a single saw and cutter alone, as the nature of the work occasionally requires.

Q* is an adjustable lever which bears down upon the stuff while being operated upon, and is held in the teeth of the rack R*.

The frame or gate B* is operated by means of a treadle-lever, S*, which is linked to a spring, T*, whereby the ineffective movement of the lever is produced.

The force of the spring T* may be varied to any requisite extent by the slide U*.

Having thus described my invention, what I claim as new, and desire to secure by Letters Patent, is—

The arrangement of the vertically-moving frame B* B*, adjustable bars D* D*, and springs E* E*, saws F* F*, cutters G* G*, gaged by means of the tappets i* i* and arms N*, operating substantially as described and represented.

LAWRENCE MASON.

Witnesses:
ALEX. A. C. KLAUCKE,
CHAS. D. SMITH.